(12) United States Patent
Sun et al.

(10) Patent No.: US 12,617,168 B2
(45) Date of Patent: May 5, 2026

(54) TIRE PRODUCTION METHOD AND APPARATUS

(71) Applicants: MESNAC CO., LTD., Qingdao (CN); QINGDAO MESNAC MACHINERY & ELECTRIC ENGINEERING CO., LTD., Qingdao (CN)

(72) Inventors: Xiaosong Sun, Qingdao (CN); Xue Li, Qingdao (CN); Yihang Yu, Qingdao (CN); Meng Hu, Qingdao (CN); Xingrui Li, Qingdao (CN); Jie Hu, Qingdao (CN)

(73) Assignees: MESNAC CO., LTD., Qingdao (CN); QINGDAO MESNAC MACHINERY & ELECTRIC ENGINEERING CO., LTD., Qingdao (CN)

( * ) Notice: Subject to any disclaimer, the term of this patent is extended or adjusted under 35 U.S.C. 154(b) by 238 days.

(21) Appl. No.: 18/270,480

(22) PCT Filed: Nov. 29, 2021

(86) PCT No.: PCT/CN2021/142571
§ 371 (c)(1),
(2) Date: Feb. 4, 2024

(87) PCT Pub. No.: WO2022/143790
PCT Pub. Date: Jul. 7, 2022

(65) Prior Publication Data
US 2024/0198614 A1     Jun. 20, 2024

(30) Foreign Application Priority Data
Dec. 31, 2020    (CN) .......................... 202011636146.7

(51) Int. Cl.
*B29D 30/26*          (2006.01)
*B29D 30/32*          (2006.01)

(52) U.S. Cl.
CPC ............. *B29D 30/26* (2013.01); *B29D 30/32* (2013.01); *B29D 2030/3214* (2013.01)

(58) Field of Classification Search
CPC .............................. B29D 30/26; B29D 30/32; B29D 2030/3214; B29D 2030/3221;
(Continued)

(56) References Cited

U.S. PATENT DOCUMENTS

| | | | |
|---|---|---|---|
| 5,772,836 A * | 6/1998 | Ogawa ................... | B29D 30/32 156/132 |
| 2003/0047284 A1* | 3/2003 | Akiyama ............. | B29D 30/245 156/416 |

(Continued)

FOREIGN PATENT DOCUMENTS

CN          108527904 A  *  9/2018   ............. B29D 30/26

OTHER PUBLICATIONS

Hu M, CN-108527904-A, machine translation. (Year: 2018).*

*Primary Examiner* — Sedef E Paquette
(74) *Attorney, Agent, or Firm* — Jiwen Chen; Joywin IP Law PLLC

(57)          ABSTRACT

The tire production device includes a main shaft and a turn-up rod assembly, a shim plate assembly, a lock block assembly and a middle drum assembly. The tire production method includes: adjusting initial diameters of the shim plate assembly, the lock block assembly and middle drum assembly, and adhering a sizing material; installing a tire rim outside the lock block assembly, increasing the diameter of the lock block assembly, and making it abut against and lock the tire rim; adjusting the diameter of the shim plate assembly and the middle drum assembly, so that outer surfaces are flush; turning over the turn-up rod assembly to adhere the sizing material to a tire side surface, and making the turn-up rod assembly move reversely and reset; decreasing the diameters of the shim plate assembly, the lock block assem-
(Continued)

bly and the middle drum assembly and removing the tire from the main shaft.

11 Claims, 2 Drawing Sheets

(58) Field of Classification Search
CPC .... B29D 2030/3257; B29D 2030/3264; B29D 2030/3278
USPC ................................................. 156/131, 132
See application file for complete search history.

(56) References Cited

U.S. PATENT DOCUMENTS

| | | | |
|---|---|---|---|
| 2006/0180263 A1* | 8/2006 | Takasuka ............... | B29D 30/32 156/130.7 |
| 2015/0059984 A1* | 3/2015 | Stoila .................... | B29D 30/24 156/417 |
| 2017/0113428 A1* | 4/2017 | Baldoni ................. | B29D 30/32 |

* cited by examiner adjusting initial diameters sizes of the shim plate assembly, the lock block assembly and the middle drum assembly, and adhering a sizing material

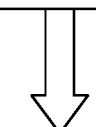

installing a tire rim outside the lock block assembly, increasing the diameter of the lock block assembly, and making the lock block assembly abut against and lock the tire rim

adjusting the diameters of the shim plate assembly and the middle drum assembly, so that outer surfaces of the shim plate assembly, the lock block assembly and the middle drum assembly are flush and form a flat and uniform surface

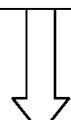

turning over the turn-up rod assembly to adhere the sizing material to a side surface of the tire, and making the turn-up rod assembly move reversely and reset after the adhering is completed

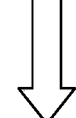

decreasing the diameters of the shim plate assembly, the lock block assembly and the middle drum assembly and removing the tire from the main shaft

Fig. 1

TIRE PRODUCTION METHOD AND APPARATUS

CROSS-REFERENCE TO RELATED APPLICATION

The present invention claims priority to and the benefit of Chinese Patent Application No. 202011636146.7, filed to the China National Intellectual Property Administration (CHIPA) on 31 Dec. 2020, which is hereby incorporated by reference in its entirety.

TECHNICAL FIELD

The present invention relates to the technical field of tire processing, and in particular to a tire production method and apparatus.

BACKGROUND TECHNOLOGY

At present, a building drum for tire building is divided into a capsule drum and a mechanical drum. The main difference between the two drums is different in a turn-up mode. The capsule drum is turned up and inflated by a turn-up capsule, and the mechanical drum is turned up by a turn-up rod. In terms of the tire building efficiency, the mechanical drum is much higher than the capsule drum, so the mechanical drum on the semi-steel building machine has a great market share. However, the structure of the mechanical building drum is complex, and replacing the size of the tire must be achieved by replacing a side drum. The tire is produced on the order in most tire factories of general scale. Thus, the number of times of replacing the side drum is relatively large, and the time of replacing the side drum once is generally about 20-30 minutes, this time to replace the side drum represents a large loss to the tire factory.

SUMMARY OF THE INVENTION

The main purpose of the present invention is to provide a tire production method and apparatus, so as to solve the problem in the related art that the replacement of tire size for a mechanical building drum is time-consuming and laborious.

In order to achieve the described object, some embodiments of the present invention provide a tire production method, a tire production apparatus includes a main shaft and a turn-up rod assembly, a shim plate assembly, a lock block assembly and a middle drum assembly which are sleeved outside the main shaft. The tire production method includes: adjusting initial diameters of the shim plate assembly, the lock block assembly and the middle drum assembly, and adhering a sizing material; installing a tire rim outside the lock block assembly, increasing the diameter of the lock block assembly, and making the lock block assembly abut against and lock the tire rim; adjusting the diameters of the shim plate assembly and the middle drum assembly, so that outer surfaces of the shim plate assembly, the lock block assembly and the middle drum assembly are flush and form a flat and uniform surface; turning over the turn-up rod assembly to adhere the sizing material to a side surface of the tire, and making the turn-up rod assembly move reversely and reset after the adhering is completed; decreasing the diameters of the shim plate assembly, the lock block assembly and the middle drum assembly and removing the tire from the main shaft.

In some embodiments, when adjusting the initial diameters, if a size of the tire to be processed is a first preset size, retracting the shim plate assembly, and adjusting the diameters of the lock block assembly and the middle drum assembly to a minimum diameter, if the size of the tire to be processed is a second preset size greater than the first preset size, expanding the shim plate assembly, and adjusting the diameters of the lock block assembly and the middle drum assembly to a mid diameter, and the mid diameter is at least one.

In some embodiments, before turning over of the turn-up rod assembly, a forward and backward actuator of the shim plate assembly drives a shim plate block of the shim plate assembly to move axially, and enables the shim plate block to avoid a roller of the turn-up rod assembly, and then turning over of the turn-up rod assembly, so that the rollers of the turn-up rod assembly press the sizing material to adhere the sizing material to the side surface of the tire.

In some embodiments, when adjusting the diameter of the shim plate assembly, a first slope of an expansion actuator of the shim plate assembly interacts with a second slope of the shim plate block of the shim plate assembly, and a diameter of the shim plate block is adjusted to a desired value.

In some embodiments, when adjusting the diameter of at least one of the lock block assembly and the middle drum assembly, driving a piston of a drive assembly of the lock block assembly (40) or the middle drum assembly (50) to move different distances by pressuring different air chambers of an air cylinder of the drive assembly, so that a transmission assembly of the lock block assembly or the middle drum assembly drives a diameter-reducing member of the lock block assembly or the middle drum assembly to adjust to a minimum diameter, the mid diameter or a maximum diameter; or driving the piston to a retracted position or an expanded position by pressuring the air cylinder of the drive assembly, or not pressuring the air cylinder, the piston moves to a mid position under an action of an elastic member of the drive assembly, so that the transmission assembly drives the diameter-reducing member to adjust to the minimum diameter, the maximum diameter or the mid diameter; or driving a screw rod of the drive assembly to rotate by a motor of the drive assembly, and the screw rod drives a nut of the drive assembly to move axially, so that the diameter-reducing member adjusts to the minimum diameter, the mid diameter or the maximum diameter.

In some embodiments, when adjusting the diameters of the shim plate assembly, the lock block assembly and the middle drum assembly, the adjustment is performed by means of stepwise adjustment or stepless adjustment.

Some other embodiments of the present invention provide a tire production apparatus, including: a main shaft; a turn-up assembly, which is configured for processing a side of a tire; a shim plate assembly, the shim plate assembly is sleeved on the main shaft, and expands and retracts along a radial direction of the main shaft; a lock block assembly, the lock block assembly is sleeved on the main shaft, and expands and retracts along the radial direction of the main shaft; a middle drum assembly, the middle drum assembly is sleeved on a main shaft, and expands and retracts along the radial direction of the main shaft, and there are a plurality of the shim plate assemblies, the lock block assemblies and the turn-up rod assemblies, the lock block assemblies, the shim plate assemblies and the turn-up rod assemblies are arranged in sequence along a direction away from the middle drum assembly on both sides of the middle drum assembly.

In some embodiments, the shim plate assembly includes: an expansion actuator arranged along an axial direction of the main shaft; a shim plate block, the shim plate block abuts against an output end of the expansion actuator, and the shim plate block expands and retracts along the radial direction of the main shaft under a drive of the expansion actuator.

In some embodiments, the output end of the expansion actuator is provided with a first slope, an inner side of the shim plate block is provided with a second slope, the first slope and the second slope abut against and are pressed against each other, and the expansion actuator presses the second slope by the first slope to drive the shim plate block to expand and retract.

In some embodiments, one end of the turn-up rod assembly close to the middle drum assembly is provided with a roller; the shim plate assembly further includes a forward and backward actuator; the forward and backward actuator is connected to the shim plate block in a drive manner, and drives the shim plate block to move along the axial direction of the main shaft, so as to block or avoid the roller.

In some embodiments, at least one of the lock block assembly and the middle drum assembly includes: a drive assembly; a transmission assembly, the transmission assembly is connected to the drive assembly in a drive manner; and a diameter-reducing member, the diameter-reducing member is connected to the transmission assembly and expands and retracts along the radial direction of the main shaft driven by the transmission assembly to switch between a minimum diameter and a maximum diameter.

In some embodiments, the drive assembly is arranged along an axial direction of the main shaft, the transmission assembly is bent, one end of the transmission assembly is connected to an output end of the drive assembly, and the other end of the transmission assembly is connected to the diameter-reducing member.

In some embodiments, the drive assembly includes: an air cylinder; a piston, the piston is movably arranged in the air cylinder and connected to the transmission assembly, the air cylinder forms a plurality of air chambers of different sizes, the pistons move different distances when pressuring the plurality of air chambers of different sizes, and the piston moves between a retracted position and an expanded position that move to an end of the cylinder, and a mid position located between the retracted position and the expanded position, so that the diameter-reducing member respectively forms the minimum diameter and the maximum diameter, and at least one mid diameter between the minimum diameter and the maximum diameter.

In some embodiments, the drive assembly includes: an air cylinder; a piston, the piston is movably arranged in the air cylinder; an elastic member, the elastic member abuts against the piston and is connected to the transmission assembly, the piston has a retracted position and an expanded position that move to an end of the air cylinder, and a mid position located between the retracted position and the expanded position, the piston is located in the mid position when the elastic member is in a natural state, when the piston is in the retracted position, the and the expanded position, the diameter-reducing element respectively forms the minimum diameter, at least one mid diameter and the maximum diameter which increase successively.

In some embodiments, the drive assembly includes: a motor; a screw rod, the screw rod is connected to the motor in a drive manner and rotates driven by the motor; a nut, the nut is fitted with the screw rod by threads and connected to the transmission assembly, the screw rod drives the nut to move axially between a retracted position, a mid position and an expanded position, so that the diameter-reducing member forms the minimum diameter, at least one mid diameter and the maximum diameter which increase successively.

By applying the technical solution of the present invention, radial expansion and retraction is able to be realized by means of the shim plate assembly, the lock block assembly and the middle drum assembly, so that the three form a cylindrical outer surface at each radial position for adhering each half piece of material constituting the tire. When using, initial diameters of the shim plate assembly, the lock block assembly and the middle drum assembly are adjusted according to the size of the tire to be processed, so that the cylindrical outer surface formed by the three together meet the processing requirements such as adhering the sizing material, and then operations such as installing a tire rim and adhering the sizing material are performed. By adjusting and expanding the diameter formed by the three, the tire rim is fixed and form a flat circular face, then the tire is processed and formed by means of the turn-up rod assembly cooperating with inflation, etc., and after the processing is completed, the tire is removed by reducing the diameters of the shim plate assembly, the lock block assembly and the middle drum assembly. Since the diameters of the shim plate assembly, the lock block assembly and the middle drum assembly are all able to be adjusted, it is only necessary to correspondingly adjust the diameters of the three when processing tires of different size classes. By means of the described method, a tire production apparatus is able to process a plurality of tires of different size classes, and only the diameter needs to be adjusted without replacing the side drum, thereby simply and quickly achieving the processing of a plurality of tires of different size classes, which not only saves time and effort, but also improves the processing efficiency, thereby avoiding various losses caused by the replacement of the side drum. In addition, the plurality of tires of different size classes are processed with one apparatus, thereby reducing manufacturing costs.

BRIEF DESCRIPTION OF THE DRAWINGS

The accompanying drawings, which form a part of the present invention, are configured for providing a further understanding of the present invention. The embodiments and illustrations of the present invention are configured for explaining the present invention, and do not form improper limits to the present invention. In the drawings:

FIG. 1 shows a flowchart of a tire production method of the present invention;

Figures 2, 3:
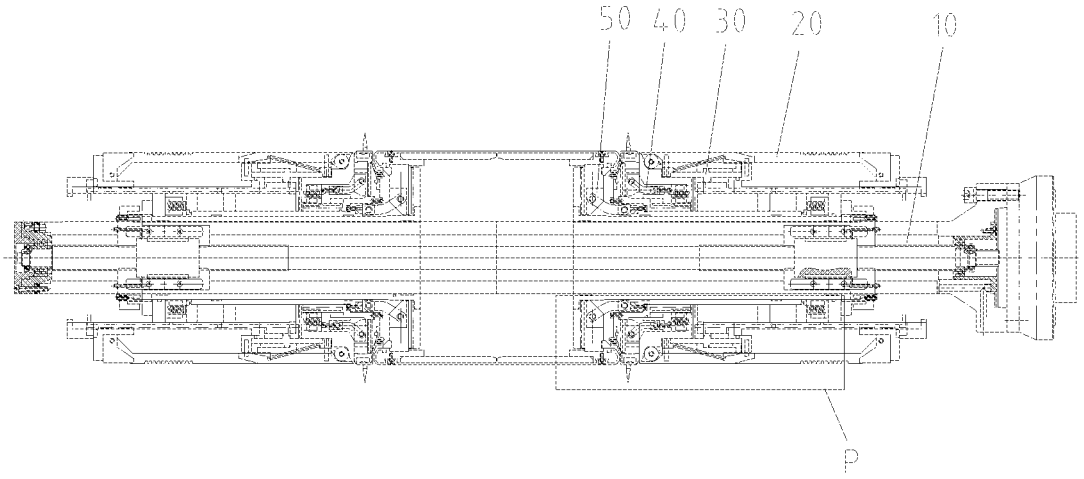
FIG. 2 shows a structural schematic diagram of a tire production apparatus of the present invention.
FIG. 3 shows an enlarged view of P in FIG. 2.

The figures include the following reference signs:

10: main shaft; 20: turn-up rod assembly; 21: roller; 30: shim plate assembly; 31: expansion actuator; 32: shim plate block; 33: forward and backward actuator; 40: lock block assembly; 41: drive assembly; 411: driver member; 412: output member; 413: elastic member; 42: transmission assembly; 43: diameter-reducing member; 50: middle drum assembly.

DETAILED DESCRIPTION OF THE EMBODIMENTS

It is important to note that the embodiments of the present invention and the characteristics in the embodiments can be combined under the condition of no conflicts. The present invention will be described below with reference to the drawings and embodiments in detail.

In order to solve the problem in the related art that the replacement of tire size for a mechanical building drum is time-consuming and laborious, the present invention provides a tire production method and apparatus.

FIG. 1 shows a tire production method, A tire production apparatus as shown in FIGS. 2-3 includes a main shaft 10, and a turn-up rod assembly 20, a shim plate assembly 30, a lock block assembly 40 and a middle drum assembly 50 which are sleeved outside the main shaft 10. The tire production method includes: adjusting initial diameters of the shim plate assembly 30, the lock block assembly 40 and the middle drum assembly 50, and adhering a sizing material; installing a tire rim outside the lock block assembly 40, increasing the diameter of the lock block assembly 40, and making the lock block assembly 40 abut against the locking tire rim; adjusting the diameters of the shim plate assembly 30 and the middle drum assembly 50, so that outer surfaces of the shim plate assembly 30, the lock block assembly 40 and the middle drum assembly 50 are flush and form a flat and uniform surface; turning over the turn-up rod assembly 20 to adhere the sizing material to a side surface of the tire, and making the turn-up rod assembly 20 move reversely and reset after the adhering is completed; decreasing the diameters of the shim plate assembly 30, the lock block assembly 40 and the middle drum assembly 50 and removing the tire from the main shaft 10.

In the embodiment, by applying the technical solution of the present invention, radial expansion and retraction is able to be realized by means of the shim plate assembly, the lock block assembly and the middle drum assembly, so that the three form a cylindrical outer surface at each radial position for adhering each half piece of material constituting the tire. When using, initial diameters of the shim plate assembly, the lock block assembly and the middle drum assembly are adjusted according to the size of the tire to be processed, so that the cylindrical outer surface formed by the three together meet the processing requirements such as adhering the sizing material, and then operations such as installing a tire rim and adhering the sizing material are performed. By adjusting and expanding the diameter formed by the three, the tire rim is fixed and form a flat circular face, then the tire is processed and formed by means of the turn-up rod assembly cooperating with inflation, etc., and after the processing is completed, the tire is removed by reducing the diameters of the shim plate assembly, the lock block assembly and the middle drum assembly. Since the diameters of the shim plate assembly, the lock block assembly and the middle drum assembly are all able to be adjusted, it is only necessary to correspondingly adjust the diameters of the three when processing tires of different size classes. By means of the described method, a tire production apparatus is able to process a plurality of tires of different size classes, and only the diameter needs to be adjusted without replacing the side drum, thereby simply and quickly achieving the processing of a plurality of tires of different size classes, which not only saves time and effort, but also improves the processing efficiency, thereby avoiding various losses caused by the replacement of the side drum. In addition, the plurality of tires of different size classes are processed with one apparatus, thereby reducing manufacturing costs.

The embodiment is described by taking a tire processed in two size classes as an example. The two size classes are divided into a first preset size and a second preset size which are relatively small. When adjusting the initial diameter, if the size class of the tire to be processed is the first preset size, the shim plate assembly 30 is retracted, the diameters of the lock block assembly 40 and the middle drum assembly 50 are adjusted to a minimum diameter, and the diameters are naturally limited by a tire rim or the like during subsequent expansion; if the size class of the tire to be processed is the second preset size which is greater than the first preset size, the shim plate assembly 30 is expanded during adjustment, the diameters of the lock block assembly 40 and the middle drum assembly 50 are adjusted to a middle diameter, and then are adjusted to a maximum diameter during subsequent re-expansion. Of course, in addition to processing tires of two size classes, more adjustable diameters are added to process tires of more size classes.

In the embodiment, before turning over the turn-up rod assembly 20, a backward and forward actuator 33 of the shim plate assembly 30 drives a shim plate block 32 of the shim plate assembly 30 to move axially, and enables the shim plate blocks 32 to avoid a roller 21 of the turn-up rod assembly 20, and then turning over the turn-up rod assembly 20, so that the roller 21 of the turn-up rod assembly 20 press the sizing material to adhere the sizing material to the side surface of the tire. The shim plate block 32 has a radial movement and an axial movement, in which the radial movement is for adjusting the diameter in order to fit with tires of different size classes, and the axial movement is to shield or avoid the roller 21 of the turn bar assembly 20. Specifically, the shim plate assembly 30 shields the roller 21 of the turn bar assembly 20 when the turn-up rod assembly 20 does not operate, so that the outer surface of the apparatus forms a flat arc surface, thereby avoiding the situation where the unevenness affects the operations such as adhering the sizing material, when the turn-up rod assembly 20 is required to operate, the shim plate block 32 avoids the roller 21 under the drive of the forward and backward actuator 33, which enables the turn-up rod assembly 20 to process the tire normally.

In the embodiment, when adjusting the diameter of the shim plate assembly 30, a first slope of an expansion actuator 31 of the shim plate assembly 30 abuts against and is pressed against a second slope of the shim plate block 32 of the shim plate assembly 30, so that a diameter of the shim plate block 32 is retracted or expanded to a required value by means of the interaction between the first slope and the second slope.

In the embodiment, a structure of the lock block assembly 40 and a structure of the middle drum assembly 50 are substantially the same, and the adjustment manners of the diameters of the two are also the same. According to the differences in the structures adopted by the lock block assembly 40 and the middle drum assembly 50, the specific adjustment manners are the following manners, specifically: Manner 1

The lock block assembly 40 and the middle drum assembly 50 include a drive assembly 41, a transmission assembly 42 and a diameter-reducing member 43, wherein the drive assembly 41 includes an air cylinder and a piston, the cylinder is provided with a plurality of air chambers, and the piston and the plurality of air chambers are matched, when pressuring different air chambers of the plurality of air chambers of the air cylinder of the drive assembly 41 of the lock block assembly 40 or the middle drum assembly 50, due to different sizes of the plurality of air chambers, movement distances that the plurality of air chambers drive the piston of the drive assembly 41 are also different. Thus, the piston moves between a retracted position, a mid position and an expanded position, and the movement distances of the piston directly influence the diameter of the diameter-reducing member 43. Thus, the transmission assembly 42 of the lock block assembly 40 or the middle drum assembly 50 drives the diameter-reducing member 43 of the lock block assembly 40 or the middle drum assembly 50 to adjust to the minimum diameter, the mid diameter, or the maximum diameter.

Manner 2

The lock block assembly 40 and the middle drum assembly 50 still include the described components, and the difference lies in that the air cylinder is not provided with air chambers of different sizes, but is also provided with an elastic member 413, the elastic member 413 abuts against the piston, and when the elastic member 413 is in a natural state, the piston is located in the mid position under the action of the elastic member 413. By means of pressuring the air cylinder of the drive assembly 41, the piston is driven to compress or stretch the elastic member 413 so as to move to the retracted position or the expanded position. When the piston needs to be located in the mid position, the piston is able to move to the mid position under the action of the elastic member 413 of the drive assembly 41 without pressuring the air cylinder. In this way, the transmission assembly 42 is able to drive the diameter-reducing member 43 to adjust to the minimum diameter, the maximum diameter or the mid diameter.

Manner 3

The drive assembly 41 of the lock block assembly 40 and the middle drum assembly 50 include a motor, a screw rod and a nut, the screw rod is connected to the motor in a drive manner. The motor drives the screw rod to rotate, and the screw rod drives the nut to move axially, so that the nut moves in the retracted position, the mid position and the expanded position, and the nut is able to drive the diameter-reducing member 43 to adjust to the minimum diameter, the mid diameter or the maximum diameter by means of the transmission assembly 42.

In the described three manners, the diameter of the diameter-reducing member 43 is controlled by controlling an axial movement distance of an output end of the drive assembly 41. Definitely, in addition to the foregoing three manners, the diameter of the diameter-reducing member 43 is also adjusted in other manners. Furthermore, when adjusting the diameters of the shim plate assembly 30, the lock block assembly 40 and the middle drum assembly 50, the adjustment is performed by means of stepwise adjustment, for example, setting a plurality of mid positions, mid diameters, etc. with different rank sizes; alternatively, the adjustment is performed by stepless adjustment, for example, any diameter between the maximum diameter and the minimum diameter is used as the mid diameter, and the diameters of the shim plate assembly 30, the lock block assembly 40 and the middle drum assembly 50 are adjusted to a required size by means of stepless adjustment.

The embodiment further provides a tire production apparatus. As shown in FIGS. 2-3, the apparatus includes the main shaft 10, the turn-up rod assembly 20, the shim plate assembly 30, the lock block assembly 40 and the middle drum assembly 50, wherein the turn-up rod assembly 20 is configured for processing a side of a tire; the shim plate assembly 30 is sleeved on the main shaft 10, and the shim plate assembly 30 expands and retracts along the radial direction of the main shaft 10; the lock block assembly 40 is sleeved on the main shaft 10, and expands and retracts along the radial direction of the main shaft 10; the middle drum assembly 50 is sleeved on the main shaft 10, and expands and retracts along the radial direction of the main shaft 10, there are a plurality of shim plate assemblies 30, the lock block assemblies 40 and the turn-up rod assemblies 20, and the lock block assemblies 40, the shim plate assemblies 30 and the turn-up rod assemblies 20 are arranged in sequence along a direction away from the middle drum assembly 50 on both sides of the middle drum assembly 50. As mentioned above, by means of the mutual cooperation between the described assemblies and the adjustment between the formation of the assemblies, so that the tire production apparatus is able to process a plurality of tires of different size classes, and there is no need to replace the side drum. It is only necessary to adjust the diameters, so that a plurality of inscribable stages of tires can be easily and quickly processed, which not only saves time and effort, but also improves the machining efficiency, thereby avoiding various losses caused by the replacement of the side drum.

As shown in FIG. 3, the shim plate assembly 30 includes an expansion actuator 31 and a shim plate block 32, wherein the expansion actuator 31 is arranged along the axial direction of the main shaft 10; the shim plate block 32 abuts against an output end of the expansion actuator 31, and the shim plate block 32 expands and retracts along the radial direction of the main shaft 10 under a drive of the expansion actuator 31. Specifically, the output end of the expansion actuator 31 is provided with a first slope, an inner side of the shim plate block 32 is provided with a second slope, and the first slope and the second slope abut against and are pressed against each other. In this way, when the expansion actuator 31 moves, the first slope presses the second slope, so that an axial movement of the expansion actuator 31 is converted into a radial movement, thereby driving the shim plate block 32 to expand and retract.

In the embodiment, one end of the turn-up rod assembly 20 adjacent to the middle drum assembly 50 is provided with a roller 21, and the shim plate assembly 30 further includes a forward and backward actuator 33, the forward and backward actuators 33 are arranged along the radial direction of the main shaft 10 and are directly or indirectly connected to the shim plate block 32 in a drive manner, the shim plate block 32 not only has the function of adjusting the diameter, but also has the function of shielding the roller 21. Specifically, the shim plate assembly 30 shields the roller 21 of the turn bar assembly 20 when the turn-up rod assembly 20 does not operate, so that the outer surface of the apparatus forms a flat arc surface; when the turn-up rod assembly 20 is required to operate, the shim plate block 32 avoids the roller 21 under the drive of the forward and backward actuator 33, which enables the turn-up rod assembly 20 to process the side of the tire normally.

In the embodiment, the structure of the lock block assembly 40 is substantially the same as that of the central drum assembly 50, and both the lock block assembly 40 and the central drum assembly 50 include the drive assembly 41, the transmission assembly 42 and the diameter-reducing member 43, the transmission assembly 42 is connected to the drive assembly 41 in a drive manner, and the drive assembly 41 is arranged along the axial direction of the main shaft 10, i.e. the axial direction of the drive assembly 41 is perpendicular to the expansion direction of the diameter-reducing member 43, the diameter-reducing member 43 is connected to the transmission assembly 42, and the diameter-reducing member 43, as the outermost side of the apparatus as a whole, forms an arc surface, thus, the diameter-reducing member 43 is able to be driven by the transmission assembly 42 to expand and retract along the radial direction of the main shaft 10, to switch between the minimum diameter and the maximum diameter.

In general, the diameter-reducing member 43 of the lock block assembly 40 is a lock block sliding block, which is configured for fitting with a tire rim to lock the tire rim, and the diameter-reducing member 43 of the middle drum assembly 50 is a middle drum plate located in an axial middle of the main shaft 10 and configured for fitting with the size material.

In an embodiment, the diameter-reducing member 43 of the middle drum assembly 50 and the shim plate block 32 of the shim plate assembly 30 are both of tooth block structure.

With regard to the lock block assembly 40 and the middle drum assembly 50, one difference therebetween lies in the specific structure of the transmission assembly 42, the transmission assembly 42 of the lock block assembly 40 is a connecting rod with a bent shape, and one end of the connecting rod is connected to the output end of the drive assembly 41 in a rotatable manner, the other end is connected to the diameter-reducing member 43 in a rotatable manner, and by pushing the connecting rod by the drive assembly 41, the connecting rod rotates and drives the diameter-reducing member 43 to move radially, thereby achieving the conversion of the movement direction; the transmission assembly 42 of the middle drum assembly 50 further includes a middle drum sliding block in addition to the connecting rod. One end of the connecting rod away from the drive assembly 41 is connected to the middle drum sliding block, and the middle drum sliding block is connected to the diameter-reducing member 43, thereby driving the diameter-reducing member 43 to move radially. Of course, in addition to the above manners, other components are also added to the transmission assembly 42 as required. It should be noted that, although the structure of the transmission assembly 42 of the lock block assembly 40 is different from that of the middle drum assembly 50, the transmission assemblies 42 of the lock block assembly 40 and the middle drum assembly 50 have the same function, and both function as transmission and steering.

As stated above, in terms of structure, the drive assembly 41 includes a drive member 411 and an output member 412, the output member 412 moves along the axial direction of the drive member 411, so that the movement direction of the output member 412 is perpendicular to the expansion direction of the diameter-reducing member 43. The specific structure has the following three structural forms:

Manner 1 the drive member 411 is an air cylinder, the output member 412 is a piston, and the piston is movably arranged in the air cylinder and is connected to the transmission assembly 42, the air cylinder forms a plurality of air chambers of different sizes, and when pressuring the plurality of air chambers of different sizes, the piston moves at different distances, the piston is located in the retracted position when moving to one end of the air cylinder, and the piston is located in the expanded position when moving to the other end, and the piston is located in the mid position when moving to the middle of two ends of the air cylinder, In the above three positions, the diameter-reducing member 43 respectively forms the minimum diameter, the maximum diameter, and the mid diameter between the minimum diameter and the maximum diameter. In this way, the piston is moved by different distances by pressuring different air chambers of the plurality of air chambers, so that the diameter-reducing member 43 forms different diameters.

Manner 2 the actuator 411 is an air cylinder, the output member 412 is a piston, the drive assembly 41 further includes an elastic member 413, and the piston is movably arranged in the air cylinder; this manner is different from the Manner 1 in that no air chambers of different sizes is provided in this manner, and the movement of the piston is controlled by the elastic member 413. The elastic member 413 abuts against the piston and is connected to the transmission assembly 42, and the piston has the retracted position and the expanded position moving to the end of the air cylinder, and the mid position located between the retracted position and the expanded position, the piston is located in the mid position when the elastic member 413 is in a natural state. In this way, when the diameter-reducing member 43 is required to be formed with the minimum diameter or the maximum diameter, the pressure is respectively transmitted to both sides of the piston in the air cylinder or a positive pressure and a negative pressure are transmitted to a side of the piston, and when the diameter-reducing member 43 is required to be formed with the mid diameter, the piston moves under the action of the elastic member 413 and be kept in the mid position without being pressurized into the air cylinder. Namely, when the piston is located in the retracted position, the mid position and the expanded position, the diameter-reducing member 43 respectively forms the minimum diameter, the mid diameter and the maximum diameter which increase successively. In this way, the diameter-reducing member 43 is able to achieve the adjustment of diameter. The structure shown in the drawing of the embodiment adopts this manner. The elastic member 413 is an elastic member such as a spring.

Manner 3

The drive member 411 is a motor, and the output member 412 is a screw rod and a nut. In this manner, the manner is driven by the motor, and because the motor drive accurately controls the stroke, the screw rod is directly connected to the motor in a drive manner, and driven by the motor to rotate, and the nut is fitted with the screw rod by threads, and is connected to the transmission assembly 42, such that when the diameter of the diameter-reducing member 43 needs to be adjusted, the screw rod is driven to rotate by the motor, the screw rod drives the nut to move axially between the retracted position, the mid position and the expanded position, so that the diameter-reducing member 43 forms the minimum diameter, the mid diameter and the maximum diameter which increase successively.

By means of the described method, it is achieved that the drive assembly 41 drives the diameter-reducing member 43 to move to a required position.

One or more mid positions and middle diameters are provided according to needs, and the diameters of the shim plate assembly 30, the lock block assembly 40 and the middle drum assembly 50 are adjusted between the minimum diameter, the maximum diameter and each middle diameter by means of stepwise adjustment or stepless adjustment.

It should be noted that, "a plurality of" in the foregoing embodiment refers to at least two.

From the above description, it is seen that the above embodiments of the present invention achieve the following technical effects:

the problem in the related art that the replacement of tire size for a mechanical building drum is time-consuming and laborious;

The tire production apparatus is able to process a plurality of tires of different size classes simply and quickly without replacing the side drum;

Not only saving time and effort, but also improving the processing efficiency, and avoiding various losses caused by the replacement of the side drum;

One apparatus is able to process two tires of different size classes, thereby reducing manufacturing costs.

Apparently, the embodiments described above are merely a part rather than all of the embodiments of the present invention. All other embodiments obtained by a person of ordinary skill in the art based on the embodiments of the present invention without creative efforts shall belong to the scope of protection of the present invention.

The foregoing descriptions are merely exemplary embodiments of the present invention, but are not intended to limit the present invention. For those skilled in the art, the present invention may have various modifications and variations. Any modifications, equivalent replacements, improvements and the like made within the spirit and principle of the present invention shall belong to the scope of protection of the present invention.

What is claimed is:

1. A tire production apparatus, comprising:
a main shaft;
a turn-up rod assembly, which is configured for processing a side of a tire;
a shim plate assembly, the shim plate assembly is sleeved on the main shaft, and expands and retracts along a radial direction of the main shaft;
a lock block assembly, the lock block assembly is sleeved on the main shaft, and expands and retracts along the radial direction of the main shaft;
a middle drum assembly, the middle drum assembly is sleeved on the main shaft, and expands and retracts along the radial direction of the main shaft, there are a plurality of the shim plate assemblies, the lock block assemblies and the turn-up rod assemblies, and the lock block assembly, the shim plate assembly and the turn-up rod assembly are arranged in sequence along a direction away from the middle drum assembly on both sides of the middle drum assembly;
wherein the shim plate assembly comprises:
an expansion actuator arranged along an axial direction of the main shaft;
a shim plate block, the shim plate block abuts against an output end of the expansion actuator, and the shim plate block-expands and retracts along the radial direction of the main shaft under a drive of the expansion actuator;
wherein the output end of the expansion actuator is provided with a first slope, an inner side of the shim plate block is provided with a second slope, the first slope and the second slope abut against and are pressed against each other, and the expansion actuator presses the second slope by the first slope to drive the shim plate block to expand and retract.

2. The tire production apparatus as claimed in claim 1, wherein one end of the turn-up rod assembly close to the middle drum assembly is provided with a roller, the shim plate assembly further comprises a forward and backward actuator, the forward and backward actuator is connected to the shim plate block in a drive manner, and drives the shim plate block to move along the axial direction of the main shaft, so as to block or avoid the roller.

3. The tire production apparatus as claimed in claim 1, wherein at least one of the lock block assembly and the middle drum assembly comprises:
a drive assembly;
a transmission assembly, the transmission assembly is connected to the drive assembly in a drive manner; and
a diameter-reducing member, the diameter-reducing member is connected to the transmission assembly and expands and retracts along the radial direction of the main shaft driven by the transmission assembly to switch between a minimum diameter and a maximum diameter.

4. The tire production apparatus as claimed in claim 3, wherein the drive assembly is arranged along an axial direction of the main shaft, the transmission assembly is bent, one end of the transmission assembly is connected to an output end of the drive assembly, and the other end of the transmission assembly is connected to the diameter-reducing member.

5. The tire production apparatus as claimed in claim 3, wherein the drive assembly comprises:
an air cylinder;
a piston, the piston is movably arranged in the air cylinder and connected to the transmission assembly, the air cylinder forms a plurality of air chambers of different sizes, the piston moves different distances when pressuring the plurality of air chambers of different sizes, and the piston moves between a retracted position and an expanded position that move to an end of the air cylinder, and a mid position located between the retracted position and the expanded position, so that the diameter-reducing member respectively forms the minimum diameter and the maximum diameter, and at least one mid diameter between the minimum diameter and the maximum diameter.

6. The tire production apparatus as claimed in claim 3, wherein the drive assembly comprises:
an air cylinder;
a piston, the piston is movably arranged in the air cylinder;
an elastic member, the elastic member abuts against the piston and is connected to the transmission assembly, the piston has a retracted position and an expanded position that move to an end of the air cylinder, and a mid position located between the retracted position and the expanded position, the piston is located in the mid position when the resilient member is in a natural state, when the piston is in the retracted position, the mid position and the expanded position, the diameter-reducing element respectively forms the minimum diameter, at least one mid diameter and the maximum diameter which increase successively.

7. The tire production apparatus as claimed in claim 3, wherein the drive assembly comprises:
a motor;
a screw rod, the screw rod is connected to the motor in a drive manner and rotates driven by the motor;
a nut, the nut is fitted with the screw rod by threads and connected to the transmission assembly, the screw rod drives the nut to move axially between a retracted position, a mid position and an expanded position, so that the diameter-reducing member forms the minimum diameter, at least one mid diameter and the maximum diameter which increase successively.

8. A tire production method using the tire production apparatus of claim 1, the tire production method comprises:
adjusting initial diameters of the shim plate assembly, the lock block assembly and the middle drum assembly, and adhering a sizing material;
installing a tire rim outside the lock block assembly, increasing a diameter of the lock block assembly, and making the lock block assembly abut against and lock the tire rim;
adjusting diameters of the shim plate assembly and the middle drum assembly, so that outer surfaces of the shim plate assembly, the lock block assembly and the middle drum assembly are flush and form a flat and uniform surface;

turning over the turn-up rod assembly to adhere the sizing material to a side surface of the tire, and making the turn-up rod assembly move reversely and reset after the adhering is completed;

decreasing the diameters of the shim plate assembly, the lock block assembly and the middle drum assembly and removing the tire from the main shaft;

wherein before turning over the turn-up rod assembly, a forward and backward actuator of the shim plate assembly drives a shim plate block of the shim plate assembly to move axially, and enables the shim plate block to avoid a roller of the turn-up rod assembly, and then turning over the turn-up rod assembly, so that the roller of the turn-up rod assembly presses the sizing material to adhere the sizing material to the side surface of the tire; and wherein when adjusting the diameter of the shim plate member, the first slope of the expansion actuator of the shim plate member interacts with the second slope of the shim plate block of the shim plate member, and the diameter of the shim plate block is adjusted to a desired value.

9. The tire production method as claimed in claim 8, wherein when adjusting the initial diameters, if a size of a tire to be processed is a first preset size, retracting the shim plate assembly, and adjusting the diameters of the lock block assembly and the middle drum assembly to a minimum diameter, and if the size of the tire to be processed is a second preset size greater than the first preset size, expanding the shim plate assembly, and adjusting the diameters of the lock block assembly and the middle drum assembly to a mid diameter, and the mid diameter is at least one between the minimum diameter and a maximum diameter.

10. The tire production method of claim 8, wherein when adjusting the diameter of at least one of the lock block assembly and the middle drum assembly, driving a piston of a drive assembly of the lock block assembly or the middle drum assembly to move different distances by pressuring different air chambers of an air cylinder of the drive assembly, so that a transmission assembly of the lock block assembly or the middle drum assembly drives a diameter-reducing member of the lock block assembly or the middle drum assembly to adjust to a minimum diameter, a mid diameter or a maximum diameter; or driving the piston to a retracted position or an expanded position by pressuring the air cylinder of the drive assembly, or not pressuring the air cylinder, the piston moves to a mid position under an action of an elastic member of the drive assembly, so that the transmission assembly drives the diameter-reducing member to adjust to the minimum diameter, the maximum diameter or the mid diameter; or driving a screw rod of the drive assembly to rotate by a motor of the drive assembly, and the screw rod drives a nut of the drive assembly to move axially, so that the diameter-reducing member adjusts to the minimum diameter, the mid diameter or the maximum diameter.

11. The tire production method as claimed in claim 8, wherein when adjusting the diameters of the shim plate assembly, the lock block assembly and the middle drum assembly, the adjustment is performed by stepwise adjustment or stepless adjustment.

* * * * *